United States Patent
Klausen et al.

(10) Patent No.: US 11,518,830 B2
(45) Date of Patent: Dec. 6, 2022

(54) ORGANOBORANE POLYMERS FOR TUNABLE HYDROPHILICITY AND WETTABILITY

(71) Applicant: THE JOHNS HOPKINS UNIVERSITY, Baltimore, MD (US)

(72) Inventors: Rebekka Klausen, Washington, DC (US); Heidi Lee VanDeWouw, Baltimore, MD (US); Jae Young Lee, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 16/756,613

(22) PCT Filed: Oct. 16, 2018

(86) PCT No.: PCT/US2018/055969
§ 371 (c)(1),
(2) Date: Apr. 16, 2020

(87) PCT Pub. No.: WO2019/079223
PCT Pub. Date: Apr. 25, 2019

(65) Prior Publication Data
US 2020/0262947 A1 Aug. 20, 2020

Related U.S. Application Data

(60) Provisional application No. 62/573,065, filed on Oct. 16, 2017.

(51) Int. Cl.
| | | |
|---|---|---|
| C08F 30/06 | (2006.01) | |
| C08F 130/06 | (2006.01) | |
| C07F 5/02 | (2006.01) | |
| C08F 230/06 | (2006.01) | |

(52) U.S. Cl.
CPC ............ *C08F 130/06* (2013.01); *C07F 5/027* (2013.01); *C08F 30/06* (2013.01); *C08F 230/065* (2020.02)

(58) Field of Classification Search
CPC ...... C08F 30/06; C08F 130/06; C08F 230/06; C08F 230/065; C08F 26/06; C08F 126/06; C08F 226/06
See application file for complete search history.

(56) References Cited

U.S. PATENT DOCUMENTS

| 5,252,684 A * | 10/1993 | Zank | C04B 35/589 |
| | | | 528/7 |
| 8,921,554 B2 | 12/2014 | Liu et al. | |
| 2011/0021735 A1* | 1/2011 | Liu | C07F 5/02 |
| | | | 546/10 |
| 2011/0021818 A1 | 1/2011 | Liu et al. | |

FOREIGN PATENT DOCUMENTS

| WO | 2011143563 A2 | 11/2011 |
| WO | 2014018263 A1 | 1/2014 |
| WO | 2015160688 A1 | 10/2015 |

OTHER PUBLICATIONS

Thiedemann, Chem. Commun., 2017, 53, 7258-7261 (Year: 2016).*
Shimamura, Polymers for Advanced Technologies, 13, 205-209 (2002) (Year: 2002).*
Van De Wouw et al., Gram-scale free radical polymerization of an azaborine vinyl monomer., Chem. Commun. 2017, 53, 7262-7265.
Marin et al., A review of polyvinyl alcohol derivatives: Promising materials for pharmaceutical and biomedical applications., African Journal of Pharmacy and Pharmacology., 8(24):674.
Gaaz et al., Properties and Applications of Polyvinyl Alcohol, Halloysite Nanotubes and Their Nanocomposites., Molecules 2015, 20(12), 22833-22847.
Muppalaneni et al., Polyvinyl Alcohol in Medicine and Pharmacy: A Perspective., Journal of Developing Drugs 2013, 2:3.
Halima., Poly(vinyl alcohol): review of its promising applications and insights into biodegradation., RSC Adv., 2016, 6, 39823-39832.
Moulay et al., Review: Poly(vinyl alcohol) Functionalizations and Applications., Polymer-Plastics Technology and Engineering, 54:12, 1289-1319.
Imoto et al., Preparation and Properties of Styrene-Vinyl Alcohol Block Copolymers., 1960 Macromolecular Chemistry and Physics 36(1): 93.
Li et al., Synthesis and micellar behavior of poly(vinyl alcohol-b-styrene) copolymers containing PVA blocks with different syndiotacticity., Colloid and Polymer Science 2005, vol. 283, Issue 9, pp. 946-953.
Chung, TC, et al., "Organoborane-Mediated Synthesis of Functional Polymers: A Review", Heteroatom Chemistry, 1991, vol. 2, No. 5, pp. 545-552.
Li, H., et al., "Amphiphilic Block Copolymers of Polyvinyl Alcohol and Polystyrene and Their Surface Properties" Polymer Journal, vol. 37, No. 11, pp. 841-846 (2005).
Thiedemann, B., "High molecular weight poly(N-methyl-Bvinylazaborine) a semi-inorganic B-N polystyrene analogue" Chem. Commun., 2017, 53, 7258; DOI: 10.1039/c6cc08599g.
Wan, W., et al., "Synthesis by free radical polymerization and properties of BN-polystyrene and BN-poly (vinylbiphenyl)" Chem. Commun., 2016, 52, 13616; DOI: 10.1039/c6cc07332h.

* cited by examiner

*Primary Examiner* — Robert C Boyle
(74) *Attorney, Agent, or Firm* — Casimir Jones, S.C.; Jeffrey W. Childers

(57) ABSTRACT

Described herein are organoborane polymers and methods for the oxidation of these organoborane polymers to poly (vinyl alcohol) PVA. The organoborane polymers of the present invention respond to an external trigger by changing from a hydrophobic to a hydrophilic state.

1 Claim, No Drawings

ORGANOBORANE POLYMERS FOR TUNABLE HYDROPHILICITY AND WETTABILITY

CROSS-REFERENCE TO RELATED APPLICATIONS

This application is a 35 U.S.C. § 371 U.S. national entry of International Application PCT/US2018/055969, having an international filing date of Oct. 16, 2018, which claims the benefit of U.S. Provisional Application No. 62/573,065, filed Oct. 16, 2017, the content of each of the aforementioned applications is herein incorporated by reference in their entirety.

BACKGROUND OF THE INVENTION

The surface wettability of a material is considered an intrinsic property. Approaches to controlling the behavior of water on a surface have focused on creating well-defined surface roughness patterns, inspired by biological systems in which hierarchical surface structures lead to extreme wettability properties. Superhydrophobic and superhydrophilic surfaces have diverse potential applications including oil-water separation, de-icing surfaces, self-cleaning fabrics, and drug-delivery vectors. New materials with unusual wettability properties are powerful potential tools in combination with these existing surface patterning strategies. Of particular interest are materials that respond to an external trigger by changing from a hydrophobic to a hydrophilic state.

SUMMARY OF THE INVENTION

This invention describes a class of organoborane polymers called borapolyolefins as well as a method for the oxidation of borapolyolefins to poly(vinyl alcohol) (PVA) homo- and copolymers.

One embodiment of the present invention is an organoborane polymer of formula (1).

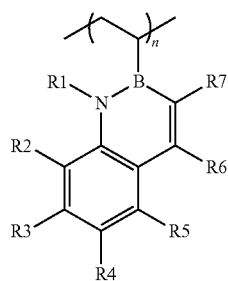

1 wherein R1 is selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and a halide group or a halide; R2, R3, R4, R5, R6, and R7 are selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and a halide group or a halide; and stereoisomers thereof; and wherein n is an integer from 1 to 1,000, 1 to 900, 1 to 800, 1 to 700, 1 to 600 1 to 500; 1 to 400; 1 to 300; or 1 to 200; 1 to 100; 1 to 50; or 1 to 25.

Another embodiment of the present invention is an organoborane polymer of formula (2).

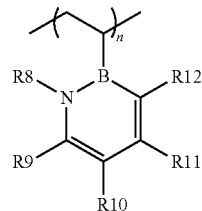

2 wherein R8 is selected from the group consisting of $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and a halide; R9, R10, R11, and R12 are selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and a halide; and stereoisomers thereof; and wherein n is an integer from 1 to 1,000, 1 to 900, 1 to 800, 1 to 700, 1 to 600 1 to 500; 1 to 400; 1 to 300; or 1 to 200; 1 to 100; 1 to 50; or 1 to 25.

Another embodiment of the present invention is an organoborane copolymer having a structure selected from the group comprising formula 3, 4, and 5

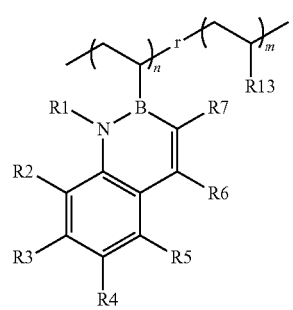

3

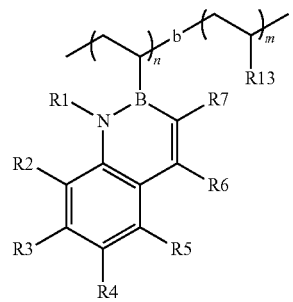

4

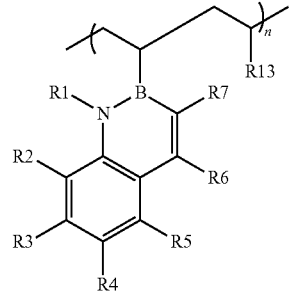

5 wherein R1 is selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and a halide; R2, R3, R4, R5, R6, and R7 are selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and a halide; and R13 is selected from the group consisting of H, $C_6$-$C_{14}$ aryl, $C_1$-$C_{12}$ alkyl, carbonyl, CN, and a halide; and stereoisomers thereof; wherein n is an integer from 1 to 1,000, 1 to 900, 1 to 800, 1 to 700, 1 to 600 1 to 500; 1 to 400; 1 to 300; or 1 to 200; 1 to 100; 1 to 50; or 1 to 25; wherein m is an integer from 1 to 1,000, 1 to 900, 1 to 800, 1 to 700, 1 to 600 1 to 500; 1 to 400; 1 to 300; or 1 to 200; 1 to 100; 1 to 50; or 1 to 25; and wherein r indicates a random/statistical copolymer structure; b indicates a block copolymer structure; and Formula 5 is an alternating copolymer structure.

Another embodiment of the present invention is an organoborane copolymer having a structure selected from the group comprising formula 6, 7, or 8

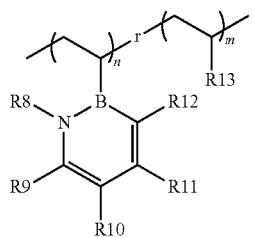

6

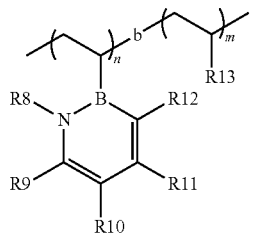

7

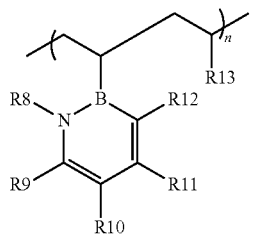

8 wherein R8 is selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and a halide; R9, R10, R11, and R12 are selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and a halide; and R13 is selected from the group consisting of H, $C_6$-$C_{14}$ aryl, $C_1$-$C_{12}$ alkyl, carbonyl, CN, and a halide; and stereoisomers thereof; wherein r indicates a random/statistical copolymer structure; b indicates a block copolymer structure; and Formula 8 is an alternating copolymer structure; wherein n is an integer from 1 to 1,000, 1 to 900, 1 to 800, 1 to 700, 1 to 600 1 to 500; 1 to 400; 1 to 300; or 1 to 200; 1 to 100; 1 to 50; or 1 to 25; and wherein m is an integer from 1 to 1,000, 1 to 900, 1 to 800, 1 to 700, 1 to 600 1 to 500; 1 to 400; 1 to 300; or 1 to 200; 1 to 100; 1 to 50; or 1 to 25.

Another embodiment of the present invention is a method of oxidizing a polymer comprising the steps of: providing an organoborane polymer of the present invention; oxidizing the organoborane polymer with an oxidizing agent;

forming a polyvinyl alcohol having a structure selected from the group comprising formula 9, 10, or 11

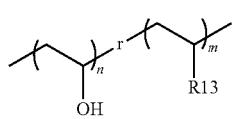

9

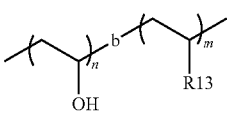

10

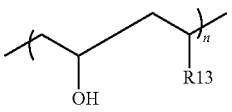

11 wherein R13 is selected from the group consisting of H, $C_6$-$C_{14}$ aryl, $C_1$-$C_{12}$ alkyl, carbonyl, CN, and a halide; n is in the range of 1 to 500; m is in the range of 1 to 500; and stereoisomers thereof; wherein n is an integer from 1 to 1,000, 1 to 900, 1 to 800, 1 to 700, 1 to 600 1 to 500; 1 to 400; 1 to 300; or 1 to 200; 1 to 100; 1 to 50; 1 to 25; and wherein m is an integer from 1 to 1,000, 1 to 900, 1 to 800, 1 to 700, 1 to 600 1 to 500; 1 to 400; 1 to 300; or 1 to 200; 1 to 100; 1 to 50; or 1 to 25. A suitable oxidizing agent used in the present invention may include hydrogen peroxide ($H_2O_2$), organic hydroperoxide, sodium perborate, trialkylamine N-oxide, molecular oxygen, a halogen, a photoredox reagent; or a combination thereof, as examples.

Another embodiment of the present invention is a method of oxidizing a polymer comprising the step of providing an organoborane polymer of formula (12),

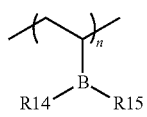

12 wherein R14 and R15 are selected from the group consisting of H, hydroxyl, amine, alkoxy, alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, and a halide group or a halide; and stereoisomers thereof; wherein n is an integer from 1 to 1,000, 1 to 900, 1 to 800, 1 to 700, 1 to 600 1 to 500; 1 to 400; 1 to 300; or 1 to 200; 1 to 100; 1 to 50; or 1 to 25.

oxidizing the organoborane polymer with an oxidizing agent;

forming poly(vinyl alcohol) (PVA) of Formula 16

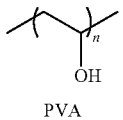

16

PVA wherein n is an integer from 1 to 1,000, 1 to 900, 1 to 800, 1 to 700, 1 to 600 1 to 500; 1 to 400; 1 to 300; or 1 to 200; 1 to 100; 1 to 50; or 1 to 25.

Another embodiment of the present invention is a method of oxidation of a polymer comprising the steps of:

providing an organoborane polymer having a structure selected from the group comprising Formula 13, 14, or 15

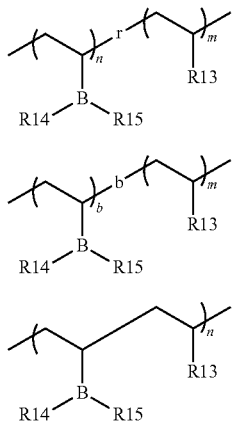

13

14

15 wherein R14 and R15 are selected from the group consisting of H, hydroxyl, amine, alkoxy, alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, and a halide; R13 is selected from the group consisting of H, $C_6$-$C_{14}$ aryl, $C_1$-$C_{12}$ alkyl, carbonyl, CN, and a halide, and stereoisomers thereof; wherein n is an integer from 1 to 1,000, 1 to 900, 1 to 800, 1 to 700, 1 to 600 1 to 500; 1 to 400; 1 to 300; or 1 to 200; 1 to 100; 1 to 50; or 1 to 25; and wherein m is an integer from 1 to 1,000, 1 to 900, 1 to 800, 1 to 700, 1 to 600 1 to 500; 1 to 400; 1 to 300; or 1 to 200; 1 to 100; 1 to 50; or 1 to 25.

wherein r indicates a random/statistical copolymer structure; b indicates a block copolymer structure; and Formula 13 is an alternating copolymer structure.

oxidizing the organoborane polymer with an oxidizing agent;

forming a poly(vinyl alcohol) of Formula 9-11

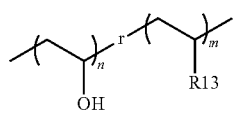

9

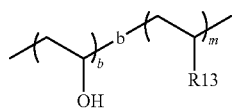

10

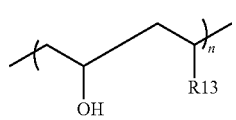

11 wherein R13 is selected from the group consisting of H, $C_6$-$C_{14}$ aryl, $C_1$-$C_{12}$ alkyl, carbonyl, CN, and a halide; and stereoisomers thereof; wherein n is an integer in the range of 1 to 500; and m is in the range of 1 to 500.

Another embodiment of the present invention is a vinyl monomer of Formula (17)

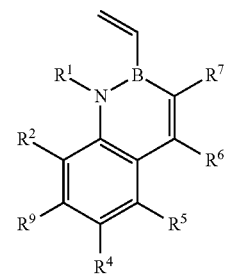

17 wherein R1 is selected from the group consisting of H, $C_1$-$C_{12}$ alkyl, $C_6$-$C_{14}$ aryl, $C_6$-$C_{14}$ arylalkyl, $C_3$-$C_{12}$ cycloalkyl and a trialkylsilyl group; and R2, R3, R4, R5, R6, and R7 are selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, and a halide.

Unless defined otherwise, all technical and scientific terms used herein have the meaning commonly understood by a person skilled in the art to which this invention belongs. The following references provide one of skill with a general definition of many of the terms used in this invention: Odian et al., Principles of Polymerization (4th ed. 2004); The Cambridge Dictionary of Science and Technology (Walker ed., 1988); Smith et al., March's Advanced Organic Chemistry ($7^{th}$ ed, 2013); the International Union of Pure and Applied Chemistry (IUPAC) Compendium of Polymer Terminology and Nomenclature (2008). As used herein, the following terms have the meanings ascribed to them below, unless specified otherwise.

In this disclosure, "comprises," "comprising," "containing" and "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Any compositions or methods provided herein can be combined with one or more of any of the other compositions and methods provided herein.

Accordingly, included within the compounds of the present invention are the tautomeric forms of the disclosed compounds, isomeric forms including constitutional isomers, enantiomers, stereoisomers, and diastereoisomers, and the industrially-acceptable salts thereof. In polymer nomenclature, a constitutional repeating unit is the atom or group of atoms (with pendant atoms or groups, if any) the repetition of which constitutes a regular macromolecule, a regular block, or a regular chain. A configurational unit is the constitutional unit the configuration of which defines at least at one site of stereoisomerism in the main chain. An atactic polymer has an equal number of the possible configurational units in a random sequence distribution. A syndiotactic polymer has alternating enantiomeric configurational units. An isotactic polymer has only one species of chiral configurational unit. A copolymer is a polymer derived from more than one species of monomer. Copolymer subtypes included within the present invention are random/statistical, block, alternating and combinations thereof. A random copolymer is a copolymer consisting of macromolecules in which the probability of finding a given monomeric unit at any given site in the chain is independent of the nature of the adjacent units. A statistical copolymer consists of macromolecules in which the sequential distribution of the monomeric units obeys known statistical laws. In this invention, random and statistical copolymers are shown with the same formula. A block copolymer consists of macromolecules in which adjacent blocks are constitutionally different, i.e., adjacent blocks are derived from different species of monomer or from the same species of monomer but with a different composition or sequence distribution of constitutional units. An alternating copolymer consists of macromolecules comprising two species of monomeric units in alternating sequence.

As used herein, examples of the term "alkyl" preferably include a $C_1$-$C_{12}$ alkyl (e.g. methyl, ethyl, propyl, n-butyl, s-butyl, t-butyl, etc.) and the like.

As used herein, examples of the term "alkenyl" preferably include $C_2$-$C_6$ alkenyl (e.g., vinyl, allyl, isopropenyl, 1-butenyl, 2-butenyl, 3-butenyl, 2-methyl-2-propenyl, 1-methyl-2-propenyl, 2-methyl-1-propenyl, etc.) and the like.

As used herein, examples of the term "alkynyl" preferably include $C_2$-$C_6$ alkynyl (e.g., ethynyl, propargyl, 1-butynyl, 2-butynyl, 3-butynyl, 1-hexynyl, etc.) and the like.

As used herein, examples of the term "cycloalkyl" preferably include a $C_3$-$C_{12}$ cycloalkyl (e.g., a cyclopropyl, cyclobutyl, cyclopentyl, cyclohexyl, etc.) and the like.

As used herein, examples of the term "aryl" preferably include a $C_6$-$C_{14}$ aryl (e.g., a phenyl, 1-naphthyl, a 2-naphthyl, 2-biphenylyl group, 3-biphenylyl, 4-biphenylyl, 2-anthracenyl, etc.) and the like.

As used herein, examples of the term "arylalkyl" preferably include a $C_6$-$C_{14}$ arylalkyl (e.g., benzyl, phenylethyl, diphenylmethyl, 1-naphthylmethyl, 2-naphthylmethyl, 2,2-diphenylethyl, 3-phenylpropyl, 4-phenylbutyl, 5-phenylpentyl, etc.) and the like.

As used herein, examples of the term "trialkylsilyl" preferably include a $C_1$-$C_{25}$ trialkylsilyl (e.g., trimethylsilyl, triethylsilyl, triisopropylsilyl, tert-butyldimethylsilyl, tert-butyldiphenylsilyl, etc.) and the like.

DETAILED DESCRIPTION OF THE INVENTION

As defined herein, a borapolyolefin is a polymer with a backbone of carbon and hydrogen atoms with a pendant boron atom.

In one aspect, the present invention describes borapolyolefins with general formula (1) or (2) shown below.

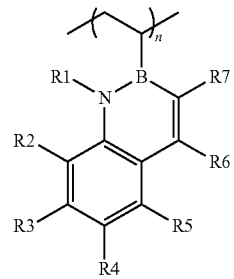

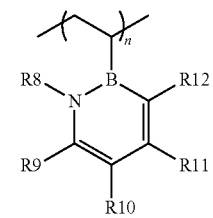

wherein formula (1) is a homopolymer with a backbone of carbon and hydrogen and a pendant extended 1,2-azaborine ring and formula (2) is a homopolymer with a backbone of carbon and hydrogen and a pendant 1,2-azaborine ring. R1 is selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and halide groups; R2, R3, R4, R5, R6, and R7 are selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and halide groups; R8 is selected from the group consisting of $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, cycloalkyl, trialkylsilyl, and halide groups; R9, R10, R11, and R12 are selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, cycloalkyl, trialkylsilyl, and halide groups; and stereoisomers thereof.

Stereoisomers refer to atactic, syndiotactic, and isotactic isomers of formulae (1) and (2). An atactic polymer has an equal number of the possible configurational base units in a random sequence distribution. A syndiotactic polymer has alternating enantiomeric configurational base units. An isotactic polymer has only one species of chiral configurational base unit. Examples of atactic, syndiotactic, and isotactic isomers of a generic polyolefin are shown below.

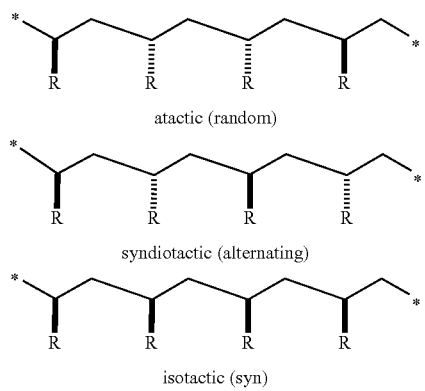

In another aspect, the present invention describes borapolyolefins with general formulae (3-5) shown below.

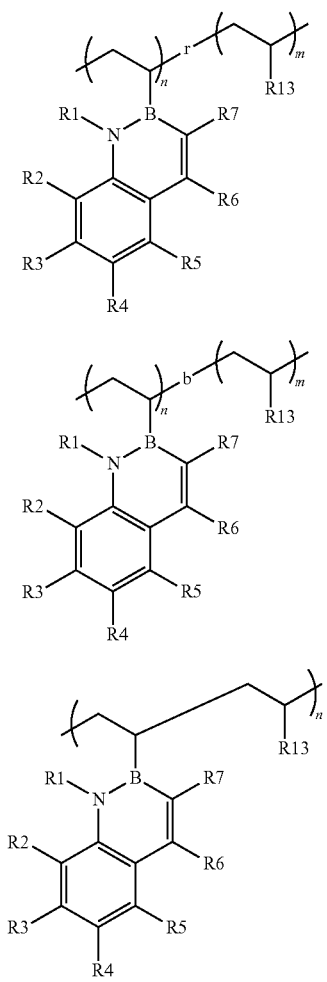

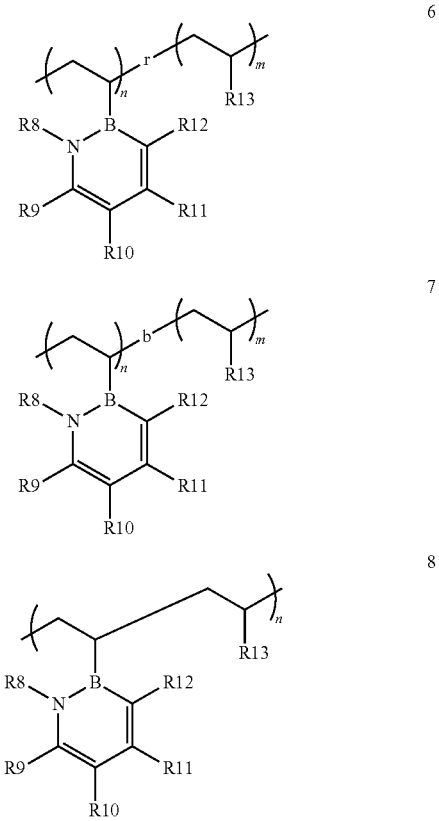

wherein formulae (3-5) describe copolymers with a backbone of carbon and hydrogen, a pendant extended 1,2-azaborine ring, and one other backbone substituent R13. Formulae 3-5 describe different constitutional isomers in which formula 3 describes a random/statistical copolymer, formula 4 describes a block copolymer, and formula 5 describes an alternating copolymer.

R1 is selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and halide groups; R2, R3, R4, R5, R6, and R7 are selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and halide groups; R8 is selected from the group consisting of $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and halide groups; R9, R10, R11, and R12 are selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and halide groups; R13 is selected from the group consisting of H, $C_6$-$C_{14}$ aryl, $C_1$-$C_{12}$ alkyl, carbonyl, CN, or a halide; and stereoisomers thereof. Stereoisomers refer to atactic, syndiotactic, and isotactic isomers of formulae (3-5).

In another aspect, the present invention describes borapolyolefins with general formulae (6-8) shown below.

wherein formulae (6-8) describe copolymers with a backbone of carbon and hydrogen, a pendant 1,2-azaborine ring, and one other backbone substituent R13. Formulae 6-8 describe different constitutional isomers in which formula 6 describes a random/statistical copolymer, formula 7 describes a block copolymer, and formula 8 describes an alternating copolymer.

R8 is selected from the group consisting of $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and halide groups; R9, R10, R11, and R12 are selected from the group consisting of H, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, trialkylsilyl, and halide groups; R13 is selected from the group consisting of H, $C_6$-$C_{14}$ aryl, $C_1$-$C_{12}$ alkyl, carbonyl, CN, or a halide; and stereoisomers thereof. Stereoisomers refer to atactic, syndiotactic, and isotactic isomers of formulae (6-8).

In another aspect, the present invention describes a method of oxidizing a borapolyolefin comprising the steps of: providing a borapolyolefin of formula (1-8), oxidizing the borapolyolefin with an oxidizing agent; and forming a poly(vinyl alcohol) homopolymer (PVA) or PVA copolymers with formulae (9-11) shown below.

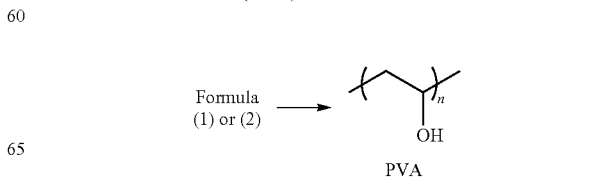

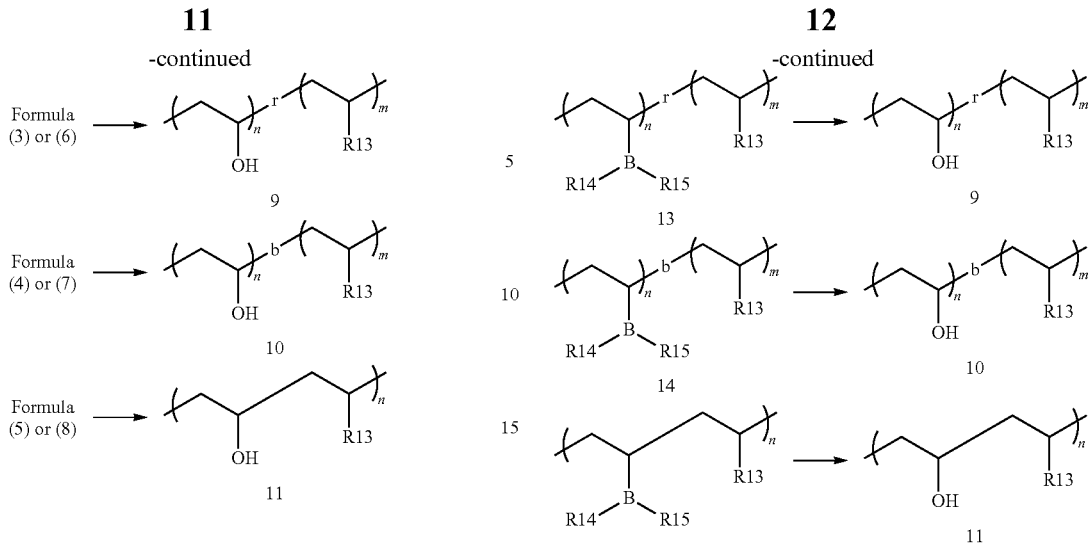

wherein formula (9-11) describe copolymers with a backbone of carbon and hydrogen, a pendant hydroxyl substituent, and one other backbone substituent R13. R13 is selected from the group consisting of H, $C_6$-$C_{14}$ aryl, $C_1$-$C_{12}$ alkyl, carbonyl, CN, or a halide; and stereoisomers thereof. Stereoisomers refer to atactic, syndiotactic, and isotactic isomers of formulae (9-11). Formulae (9-11) describe random/statistical, block, and alternating copolymer structures.

The oxidizing agents of the method include alkaline hydrogen peroxide ($H_2O_2$), organic hydroperoxides, sodium perborate, trialkylamine N-oxides, molecular oxygen, halogens, photoredox reagents; or a combination thereof.

The oxidation is chemoselective: the C—B bonds of the borapolyolefin are converted to C—O bonds. The method includes both full and partial oxidation. Any homopolymer (e.g. a borapolyolefin of formula (1) or (2)) is converted to a PVA-like structure in which at least one and up to all C—B bonds are converted to C—O bonds. Random/statistical copolymers with a pendant boron group (e.g. a borapolyolefin of formula (3) or (6)) are converted to PVA random/statistical copolymers in which at least one and up to all C—B bonds are converted to C—O bonds. Block copolymers with a pendant boron group (e.g. a borapolyolefin of formula (4) or (7)) are converted to PVA block copolymer in which at least one and up to all C—B bonds are converted to C—O bonds. Alternating copolymers with a pendant boron group (e.g. a borapolyolefin of formula (5) or (8)) are converted to PVA alternating copolymer in which at least one and up to all C—B bonds are converted to C—O bonds.

Organoborane oxidation is a stereospecific process. An atactic borapolyolefin is converted to an atactic PVA. A syndiotactic borapolyolefin is converted to a syndiotactic borapolyolefin. An isotactic borapolyolefin is converted to an isotactic borapolyolefin.

In another aspect, the present invention describes a method of oxidizing a borapolyolefin comprising the steps of: providing a borapolyolefin of formula (12-15), oxidizing the borapolyolefin with an oxidizing agent; and forming a poly(vinyl alcohol) homopolymer (PVA) or PVA copolymers with formulae (9-11) shown below.

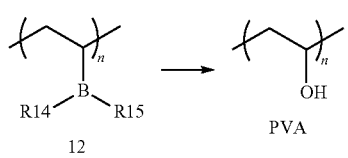

wherein formula (12-15) describe copolymers with a backbone of carbon and hydrogen, a pendant boron substituent, and one other backbone substituent R13. R13 is selected from the group consisting of H, $C_6$-$C_{14}$ aryl, $C_1$-$C_{12}$ alkyl, carbonyl, CN, or a halide; R14 and R15 are selected from the group consisting of H, hydroxyl, amine, alkoxy, $C_1$-$C_{12}$ alkyl, $C_2$-$C_6$ alkenyl, $C_2$-$C_6$ alkynyl, $C_6$-$C_{14}$ aryl, $C_6$-$C_{14}$ arylalkyl, $C_3$-$C_{12}$ cycloalkyl, and halide groups; and stereoisomers thereof. Stereoisomers refer to atactic, syndiotactic, and isotactic isomers of formulae (12-15). Formulae (13-15) describe random/statistical, block, and alternating copolymer structures.

Structures of formulae (1-8) are prepared by polymerization of a vinyl monomer with general formula (17) or (18) with or without one or more additional vinyl monomers with general formula (19). The polymerization and copolymerization of formulas (17-19) can be effected using conventional polymerization techniques (e.g. anionic, radical, cationic, or metal-catalyzed). Random/statistical copolymers are obtained by free radical polymerization. Block copolymers are obtained by controlled radical polymerization or anionic polymerization. Tactic polymers are obtained by polymerization with transition metal promoters. The Examples include methods of both homo- and copolymerization shown below.

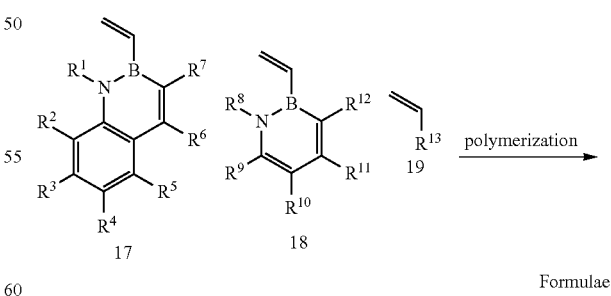

Formulae (1-8)

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter. The following Examples are offered by way of illustration and not by way of limitation.

General Considerations

All reactions were conducted under a positive pressure of inert atmosphere (nitrogen or argon), unless stated otherwise. Standard Schlenk techniques were used in all syntheses conducted under inert atmosphere and all glassware was oven-dried overnight in a 175° C. oven and cooled to room temperature under vacuum.

BN2VN was synthesized according to literature procedure (Chem. Commun. 2017, 53, 7262-7265).

Polymerization Procedure: A reaction vessel was charged with measured amounts of BN2VN, toluene, and azoisobutyrylnitrile (AIBN). The sealed vessel was heated to 70° C. or another temperature for 24 hours.

Oxidation Procedure: A reaction vessel was charged with measured amounts of polymer, tetrahydrofuran (THF), ethanol, and aqueous sodium hydroxide. Addition of aqueous hydrogen peroxide was performed at room temperature, followed by reflux for 15 hours. The reaction mixture was cooled then PVA derivatives are precipitated into deionized water, filtered, washed with water, and mixed with methanol. Methanol and methanol/borate complexes were distilled from the polymer, and the polymer dried using reduced pressure at an elevated temperature.

Polymer molecular weights were measured by gel permeation chromatography (GPC) on a Tosoh Bioscience EcoSEC GPC workstation using butylated hydroxytoluene stabilized tetrahydrofuran (THF) as the eluent (0.35 mL min-1, 40° C.) through TSKgel SuperMultipore HZ-M guard column (4.6 mm ID×2.0 cm, 4 m, Tosoh Bioscience) and a TSKgel SuperMultipore HZ-M column (4.6 mm ID×15 cm, 4 m, Tosoh Bioscience). Polystyrene standards (EasiVial PS-M, Agilent) were used to build a calibration curve. Processing was performed using EcoSEC Data Analysis software (Version 1.14, Tosoh Bioscience).

Polymers were dissolved in THF (1 mg mL$^{-1}$), filtered (Millex-FG Syringe Filter Unit, 0.20 m, PTFE, EMD Millipore), and injected using an auto-sampler (5 μL).

Example 1A

Free Radical Polymerization of BN2VN

The reaction was performed according to the general polymerization procedure described above with 1.55 g BN2VN and 16 mg AIBN. The reaction mixture was stirred for 24 hours at 70° C. and quenched by exposure to air. PBN2VN132 was isolated by precipitation into methanol (75% yield, $M_n$=20.4 kDa, $M_w/M_n$=3.87). The subscript refers to the average degree of polymerization of BN2VN.

Example 1B

Free Radical Copolymerization of BN2VN and Styrene [P(BN2VN$_{32}$-co-S$_{92}$)]

The reaction was performed according to the general polymerization procedure described above with 390 mg BN2VN, 790 mg styrene, 16 mg AIBN, and 1.0 mL toluene. The reaction mixture was stirred for 24 hours at 70° C. and quenched by exposure to air. P(BN2VN32-co-S92) was isolated by precipitation into methanol (73% yield, $M_n$=14.5 kDa, $M_w/M_n$=1.75).

Example 1C

Reversible Addition-Fragmentation Chain-Transfer Polymerization of BN2VN from a Polystyrene Macroinitiator (PS$_{43}$-b-PBN2VN$_{58}$)

160 mg of polystyrene RAFT macroinitiator was combined with 330 mg BN2VN and heated to 110° C. and quenched by exposure to air. PS$_{43}$-b-PBN2VN58 was isolated by precipitation into methanol (76% yield, $M_n$=13.8 kDa, $M_w/M_n$=1.10).

Example 2A

Hydroperoxide Oxidation of P(BN2VN$_{32}$-co-S$_{92}$)

The reaction was performed according to the general oxidation procedure described above with 200 mg of polymer dissolved in THF (25 mL), ethanol (5 mL), aqueous sodium hydroxide (6 N, 5 mL), and aqueous hydrogen peroxide (30%, 10 mL). (120 mg yield, $M_n$=9.7 kDa, $M_w/M_n$=2.01).

Example 2B

The reaction was performed according to the general oxidation procedure described above with 200 mg of polymer dissolved in THF (25 mL), ethanol (5 mL), aqueous sodium hydroxide (6 N, 5 mL), and aqueous hydrogen peroxide (30%, 10 mL). (160 mg yield, $M_n$=34.3 kDa, $M_w/M_n$=2.72).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An organoborane copolymer having a structure selected from the group comprising formula 3, 4, or 5

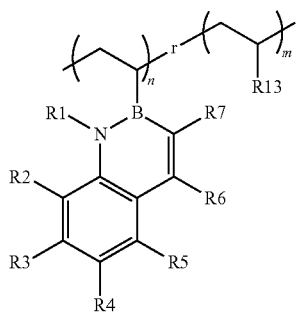

3

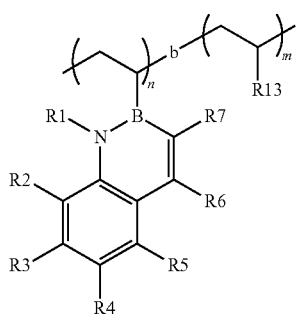

4

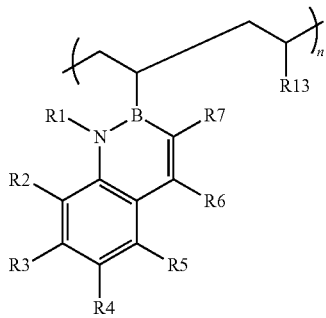

5 wherein n is an integer from 1 to 1000;

wherein m is an integer from 1 to 1000;

wherein R1 is selected from the group consisting of H, alkyl, alkenyl, alkynyl, aryl, arylalkyl, cycloalkyl, trialkylsilyl, and a halide group; R2, R3, R4, R5, R6, and R7 are selected from the group consisting of H, alkyl, alkenyl, alkynyl, aryl, arylalkyl, C3-12 cycloalkyl, trialkylsilyl, and a halide group; and R13 is selected from the group consisting of H, aryl, alkyl, carbonyl, CN, and a halide; and stereoisomers thereof; and wherein r indicates a random/statistical copolymer structure; b indicates a block copolymer structure; and Formula 5 is an alternating copolymer structure.

* * * * *